(12) United States Patent
Amer

(10) Patent No.: US 11,800,398 B2
(45) Date of Patent: Oct. 24, 2023

(54) PREDICTING AN ATTRIBUTE OF AN IMMATURE WIRELESS TELECOMMUNICATION NETWORK, SUCH AS A 5G NETWORK

(71) Applicant: T-Mobile USA, Inc., Bellevue, WA (US)

(72) Inventor: Mohamed Abdullah Amer, Naperville, IL (US)

(73) Assignee: T-Mobile USA, Inc., Bellevue, WA (US)

(*) Notice: Subject to any disclaimer, the term of this patent is extended or adjusted under 35 U.S.C. 154(b) by 110 days.

(21) Appl. No.: 17/512,565

(22) Filed: Oct. 27, 2021

(65) Prior Publication Data

US 2023/0128007 A1 Apr. 27, 2023

(51) Int. Cl.
| | | |
|---|---|---|
| *H04W 28/02* | (2009.01) | |
| *H04W 16/18* | (2009.01) | |
| *H04W 24/02* | (2009.01) | |

(52) U.S. Cl.
CPC ....... *H04W 28/0268* (2013.01); *H04W 16/18* (2013.01); *H04W 24/02* (2013.01)

(58) Field of Classification Search
None
See application file for complete search history.

(56) References Cited

U.S. PATENT DOCUMENTS

| | | |
|---|---|---|
| 7,535,922 B1 | 5/2009 | Potts |
| 7,739,491 B2 | 6/2010 | Jang et al. |
| 7,929,457 B2 | 4/2011 | Healy et al. |
| 7,933,598 B1 | 4/2011 | Agrawal et al. |
| 7,961,883 B2 | 6/2011 | Bajar et al. |

(Continued)

FOREIGN PATENT DOCUMENTS

| | | |
|---|---|---|
| CN | 105247908 B | 7/2017 |
| CN | 108604917 A | 9/2018 |

(Continued)

OTHER PUBLICATIONS

Ghasemi, Amir, "Predictive Modeling of LTE User Throughput Via Crowd-Sourced Mobile Spectrum Data", 2018 IEEE International Symposium on Dynamic Spectrum Access Networks (DySPAN), pp. 1-5.

*Primary Examiner* — Hong Shao
(74) *Attorney, Agent, or Firm* — Perkins Coie LLP

(57) ABSTRACT

The disclosed system obtains KPIs and configuration parameters associated with the mature and the immature network. A physical layer of the mature wireless telecommunication network corresponds to a physical layer of the immature wireless telecommunication network. The system combines KPIs of the immature network and KPIs of the mature network to obtain multiple KPIs. The system predicts an attribute associated with the immature wireless telecommunication network, where the attribute depends on multiple other attributes associated with the wireless telecommunication network. To make the prediction, the system provides the multiple key performance indicators and the configuration parameters to a machine learning model trained on data associated with the mature wireless telecommunication network. The machine learning model predicts the value of the attribute associated with the immature wireless telecommunication network based on the multiple key performance indicators and the configuration parameters.

20 Claims, 13 Drawing Sheets

(56) References Cited

U.S. PATENT DOCUMENTS

| | | |
|---|---|---|
| 8,150,421 B2 | 4/2012 | Ward et al. |
| 8,189,549 B2 | 5/2012 | Caldwell et al. |
| 8,190,191 B2 | 5/2012 | Livet et al. |
| 8,306,518 B1 | 11/2012 | Gailloux et al. |
| 8,340,586 B2 | 12/2012 | Wellington |
| 8,577,414 B2 | 11/2013 | Rajadurai et al. |
| 8,600,384 B1 | 12/2013 | Moreno et al. |
| 8,630,225 B2 | 1/2014 | Karaoguz et al. |
| 8,700,662 B2 | 4/2014 | Cara et al. |
| 8,954,121 B2 | 2/2015 | Kanj et al. |
| 9,049,723 B2 | 6/2015 | Dhanda et al. |
| 9,219,995 B2 | 12/2015 | Eric |
| 9,258,199 B2 | 2/2016 | Kalika et al. |
| 9,439,081 B1 | 9/2016 | Knebl et al. |
| 9,459,879 B2 | 10/2016 | Gupta et al. |
| 9,467,886 B2 | 10/2016 | Chang |
| 9,503,919 B2 | 11/2016 | Sofuoglu et al. |
| 9,526,008 B2 | 12/2016 | Prabdial et al. |
| 9,538,409 B2 | 1/2017 | Hui et al. |
| 9,572,165 B2 | 2/2017 | Keerthi |
| 9,578,519 B2 | 2/2017 | Jaldén et al. |
| 9,585,037 B1 | 2/2017 | Davari et al. |
| 9,661,515 B2 | 5/2017 | Lord et al. |
| 9,692,682 B2 | 6/2017 | Yamine et al. |
| 9,693,189 B2 | 6/2017 | Caldwell et al. |
| 9,716,633 B2 | 7/2017 | Premkumar et al. |
| 9,756,518 B1 | 9/2017 | Sheen et al. |
| 9,838,888 B2 | 12/2017 | Lihosit et al. |
| 9,924,382 B2 | 3/2018 | Bansal |
| 9,934,480 B2 | 4/2018 | Buth |
| 9,955,024 B2 | 4/2018 | Caldwell et al. |
| 9,986,580 B2 | 5/2018 | Leung et al. |
| 10,019,302 B2 | 7/2018 | Nguyen et al. |
| 10,028,121 B2 | 7/2018 | Artuso |
| 10,039,013 B2 | 7/2018 | Periyasamy et al. |
| 10,115,256 B2 | 10/2018 | Davis |
| 10,129,799 B2 | 11/2018 | Viswanathan et al. |
| 10,164,850 B2 | 12/2018 | Tapia et al. |
| 10,200,884 B2 | 2/2019 | Tan et al. |
| 10,225,117 B2 | 3/2019 | Lopez et al. |
| 10,278,081 B2 | 4/2019 | Cotanis |
| 10,306,490 B2 | 5/2019 | Ratakonda et al. |
| 10,334,488 B2 | 6/2019 | Periyasamy et al. |
| 10,374,882 B2 | 8/2019 | Sheen et al. |
| 10,397,043 B2 | 8/2019 | Tapia et al. |
| 10,397,810 B2 | 8/2019 | Yang et al. |
| 10,397,815 B2 | 8/2019 | Myron et al. |
| 10,412,550 B2 | 9/2019 | Yoon et al. |
| 10,484,253 B2 | 11/2019 | Arsenie et al. |
| 10,531,309 B1 | 1/2020 | Li et al. |
| 10,555,191 B1 | 2/2020 | Jat et al. |
| 10,602,383 B1 | 3/2020 | Horton et al. |
| 10,616,257 B1 | 4/2020 | Soulhi et al. |
| 10,674,440 B2 | 6/2020 | Taneja et al. |
| 10,681,541 B2 | 6/2020 | Laselva et al. |
| 10,708,122 B1 | 7/2020 | Liu et al. |
| 10,708,795 B2 | 7/2020 | Tapia |
| 10,716,017 B2 | 7/2020 | Lyon et al. |
| 10,728,773 B2 | 7/2020 | Ouyang et al. |
| 10,771,273 B2 | 9/2020 | Luo et al. |
| 10,785,101 B2 | 9/2020 | Li et al. |
| 10,812,330 B2 | 10/2020 | Le et al. |
| 10,860,570 B2 | 12/2020 | Ebel et al. |
| 10,904,114 B2 | 1/2021 | Thampy et al. |
| 10,924,274 B1 | 2/2021 | Piriyath et al. |
| 10,952,091 B2 | 3/2021 | Hui et al. |
| 11,006,268 B1 | 5/2021 | Kim et al. |
| 11,006,293 B1 | 5/2021 | Singh et al. |
| 11,012,864 B2 | 5/2021 | Das |
| 11,018,958 B2 | 5/2021 | Tapia |
| 11,109,283 B1 | 8/2021 | Kulkarni et al. |
| 11,115,287 B2 | 9/2021 | Soundrarajan |
| 2005/0143097 A1 | 6/2005 | Wilson et al. |
| 2006/0142021 A1 | 6/2006 | Mueckenheim et al. |
| 2007/0127417 A1 | 6/2007 | Kalika |
| 2007/0253388 A1 | 11/2007 | Pietraski |
| 2015/0245202 A1 | 8/2015 | Patil et al. |
| 2016/0337007 A1 | 11/2016 | Seyedmehdi et al. |
| 2017/0086136 A1 | 3/2017 | Yu et al. |
| 2020/0346353 A1 | 11/2020 | Szabo et al. |
| 2020/0389371 A1 | 12/2020 | Tedaldi et al. |
| 2021/0014737 A1 | 1/2021 | Yang et al. |
| 2021/0034490 A1 | 2/2021 | Knostman et al. |
| 2021/0056487 A1 | 2/2021 | Boyle et al. |
| 2021/0211900 A1 | 7/2021 | Pius et al. |
| 2021/0224699 A1 | 7/2021 | Soundrarajan et al. |
| 2021/0250230 A1 | 8/2021 | Johnson et al. |
| 2021/0250732 A1 | 8/2021 | Zhang |
| 2021/0266777 A1 | 8/2021 | Manner et al. |

FOREIGN PATENT DOCUMENTS

| | | |
|---|---|---|
| CN | 105431891 B | 1/2019 |
| CN | 105027598 B | 5/2019 |
| CN | 105376802 B | 7/2019 |
| CN | 112534963 A | 3/2021 |
| EP | 1797703 A2 | 6/2007 |
| EP | 2647239 A1 | 10/2013 |
| EP | 1987623 B1 | 3/2014 |
| EP | 3238389 B1 | 7/2019 |
| EP | 3183855 B1 | 10/2019 |
| EP | 3704881 A1 | 9/2020 |
| EP | 3841706 A1 | 6/2021 |
| EP | 3847771 A1 | 7/2021 |
| EP | 3868031 A1 | 8/2021 |
| JP | 2020515155 A | 5/2020 |
| JP | 6872630 B2 | 4/2021 |
| KR | 20200086729 A | 7/2020 |
| WO | 2008020749 A2 | 2/2008 |
| WO | 2010102242 A2 | 9/2010 |
| WO | 2011106940 A1 | 9/2011 |
| WO | 2014176503 A1 | 10/2014 |
| WO | 2015077664 A1 | 5/2015 |
| WO | 2017095303 A1 | 6/2017 |
| WO | 2018138347 A1 | 8/2018 |
| WO | 2020121084 A1 | 6/2020 |
| WO | 2020164682 A1 | 8/2020 |
| WO | 2020233464 A1 | 11/2020 |
| WO | 2021170613 A1 | 9/2021 |
| WO | 2021170617 A1 | 9/2021 |

PREDICTING AN ATTRIBUTE OF AN IMMATURE WIRELESS TELECOMMUNICATION NETWORK, SUCH AS A 5G NETWORK

BACKGROUND

With the LTE wireless telecommunication network and the increasing adoption of the 5G wireless telecommunication network, users are benefitting from increased data rates and lower latencies. A user's experience, however, might still vary significantly depending on a multitude of attributes associated with the wireless telecommunication network. Understanding how such fundamental elements affect the end-user experience could help service providers better use their spectrum by fine-tuning their deployment configuration, identifying bottlenecks and anomalies, and preemptively addressing potential performance issues.

BRIEF DESCRIPTION OF THE DRAWINGS

Detailed descriptions of implementations of the present invention will be described and explained through the use of the accompanying drawings.

Figure 1:
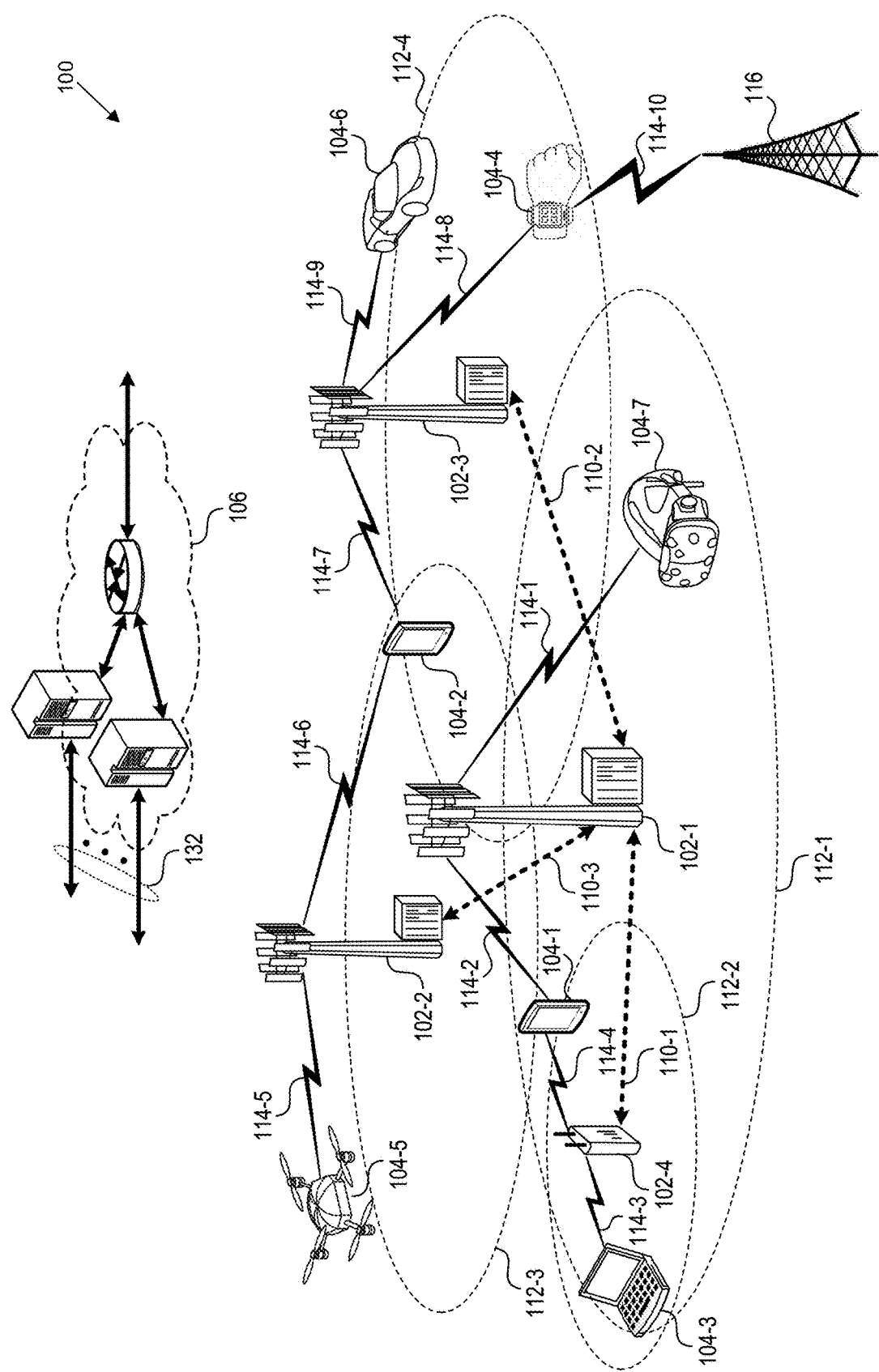
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to predict a throughput and/or latency of a wireless telecommunication network. The system can obtain multiple key performance indicators and multiple configuration parameters directly from a wireless telecommunication network. The multiple key performance indicators indicate an observed performance associated with the wireless telecommunication network, while the multiple configuration parameters indicate a configuration of the wireless telecommunication network. The multiple key performance indicators and the multiple configuration parameters can include quality of service class identifiers, modulation coding scheme, multiple-input multiple-output, carrier aggregation, number of users, band, bandwidth, and a generation of wireless technology associated with the mature wireless telecommunication network. The system can predict the throughput or latency of the wireless telecommunication network by providing the multiple key performance indicators and the multiple configuration parameters to a machine learning model. The system can predict any challenging wireless key performance indicator (KPI) that has many dependencies and requires multidimensional modeling. User throughput and user latency are examples of challenging KPIs. The examples discussed in this application include throughput, but latency and other KPIs can follow the same flow. The machine learning model can predict the throughput and/or latency of the wireless telecommunication network based on multiple key performance indicators and the multiple configuration parameters.

The disclosed system can predict a throughput of an immature or growing wireless telecommunication network, such as a 5G network. The system can obtain a first set of multiple key performance indicators associated with a mature or established wireless telecommunication network and a first set of multiple configuration parameters associated with the mature wireless telecommunication network. In the mature wireless telecommunication network, a physical layer of the mature wireless telecommunication network corresponds to a physical layer of the immature wireless telecommunication network. For example, the mature wireless telecommunication network can be a 4G network, and both the 4G and the 5G network use orthogonal frequency-division multiple access (OFDMA) digital modulation schemes. The system can obtain a second set of multiple key performance indicators associated with the immature wireless telecommunication network and a second set of multiple configuration parameters associated with the immature wireless telecommunication network. The system can combine the first set of multiple key performance indicators and the second set of multiple key performance indicators to obtain multiple key performance indicators. To combine, the system can compare whether a key performance indicator in the second set of multiple key performance indicators indicates worse performance of the immature network than the corresponding key performance indicator in the first set. If the key performance indicator indicates worse performance, the system substitutes the current key performance indicator with the corresponding key performance indicator in the first set. The system can predict the throughput of the immature wireless telecommunication network by providing the multiple key performance indicators and the second set of multiple configuration parameters to a machine learning model trained on data associated with the mature wireless telecommunication network. The machine learning model can predict the throughput of the immature wireless telecommunication network based on the multiple key performance indicators and the second set of multiple configuration parameters.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown).

The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or packet data convergence protocol (PDCP) layer can be IP-based. A radio link control (RLC) layer then performs packet segmentation and reassembly to communicate over logical channels. A medium access control (MAC) layer can perform priority handling and multiplexing of logical channels into transport channels. The MAC layer can also use hybrid automatic repeat request (HARQ) to provide retransmission at the MAC layer, to improve link efficiency. In the control plane, the radio resource control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-7), a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions, while the uplink transmissions can also be called reverse link transmissions. Each communication link 114 includes one or more carriers, where each carrier can be a signal composed of multiple subcarriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Predicting an Attribute of a Wireless Telecommunication Network

Figure 2A:
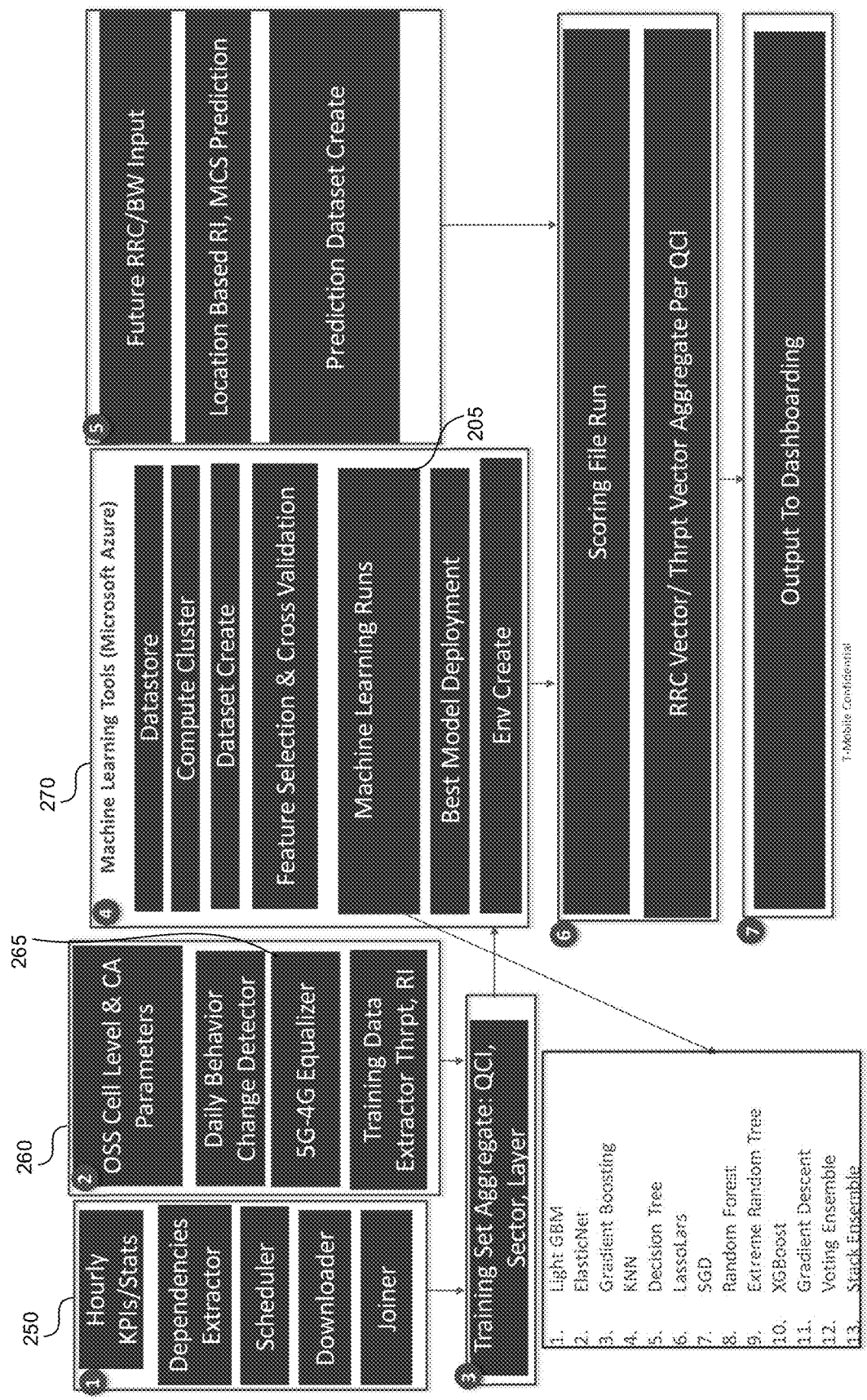
FIG. 2A shows main components of the system.

FIG. 2A shows main components of the system. Components 250, 260 gather the KPIs 220 in FIG. 2B and configuration parameters 230 in FIG. 2B that can be used to train the machine learning model 205. Component 265 performs the equalization, as explained in this application, to account for erroneous attributes associated with an immature network. Component 270 can take in the training data and train the machine learning model 205 using any combination of the machine learning training algorithm such as: Light GBM, ElasticNet, Gradient Boosting, KNN Decision Tree LassoLars, SGD, Random Forest, Extreme Random Tree, XGBoost, Gradient Descent, Voting Ensemble, and/or Stack Ensemble. In addition, once trained, the component 270 can also execute the machine learning model 205 to make a prediction. Component 270 can be Microsoft Azure Machine Learning tools, or any other machine learning tool with any other structure using any additional machine learning techniques.

Figure 2B:
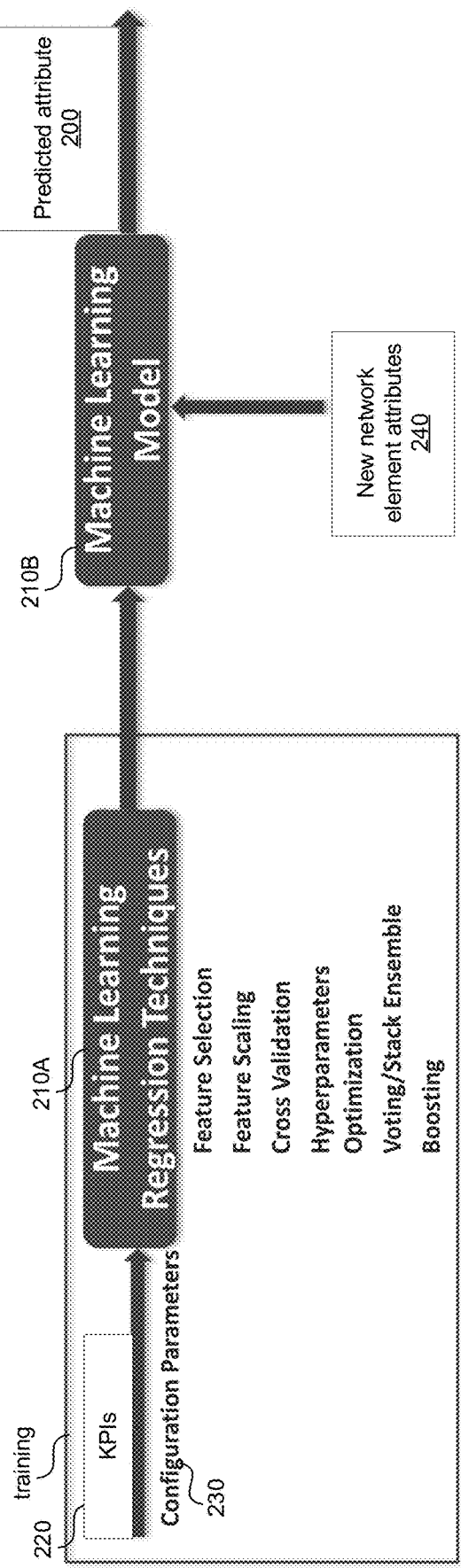
FIG. 2B shows a process of training a machine learning model to predict an attribute of a wireless telecommunication network ("network"), when the attribute has many dependencies.

FIG. 2B shows a process of training a machine learning model to predict an attribute of a wireless telecommunication network ("network"), when the attribute has many dependencies. The network 100 can be a 6G, 5G, 4G, 3G network, etc. Certain attributes 200 associated with the network 100, such as throughput and latency, depend on many other attributes of the network 100, and are difficult to predict. A machine learning model 210 can be trained to predict the attributes 200. The machine learning model 210 can include the machine learning model during training 210A, and the trained machine learning model 210B that has been deployed.

The machine learning model 210 can take as input other attributes of the network 100 such as key performance indicators (KPIs) 220 and configuration parameters 230. The key performance indicators 220 indicate an observed performance associated with the wireless telecommunication network 100. The KPIs 220 can include a number of users associated with an element of the network 100. The element of the network 100 can include a base station, an antenna, or a sector. The configuration parameters 230 indicate configuration of the network 100. The configuration parameters 230 can indicate a generation of wireless technology associated with the network 100, such as 2G, 3G, LTE, 5G, 6G, etc.

The total number of attributes 220, 230 provided to the machine learning model 210 can be 10 or more, thus creating a multidimensional space. The system obtains attributes 220, 230 directly from the network 100 for which the attribute 200 is predicted. In contrast, other prediction models obtain data from crowdsourced databases where data from multiple networks has been combined, and try to predict an attribute of a different network 100. The accuracy of such prediction models is much lower than the accuracy of the currently disclosed model, as described in this document.

The machine learning model 210 can be trained using various training techniques such as feature selection, feature scaling, cross validation, hyperparameter optimization, voting/stack ensemble, and/or boosting. Once trained, the machine learning model 210 can be used to predict the attribute 200 for a new network element. The machine learning model 210 takes as input the attributes 240 of the new network element. The attributes 240 belong to the same categories as the attributes 220, 230, as described in this document, however the values of attributes 240 are not part of the training attributes 220, 230.

For example, the attributes 220, 230 can include data from the whole United States. When a new site is created in Chicago, the system needs to predict what the throughput is going to be at the new site. The system gathers attributes 240, and provides them to the machine learning model 210. Based on the attributes 240, the machine learning model 210 predicts that the throughput for the new site is a speed of 3 megabits per second (Mbps) on a particular phone.

Figure 3:
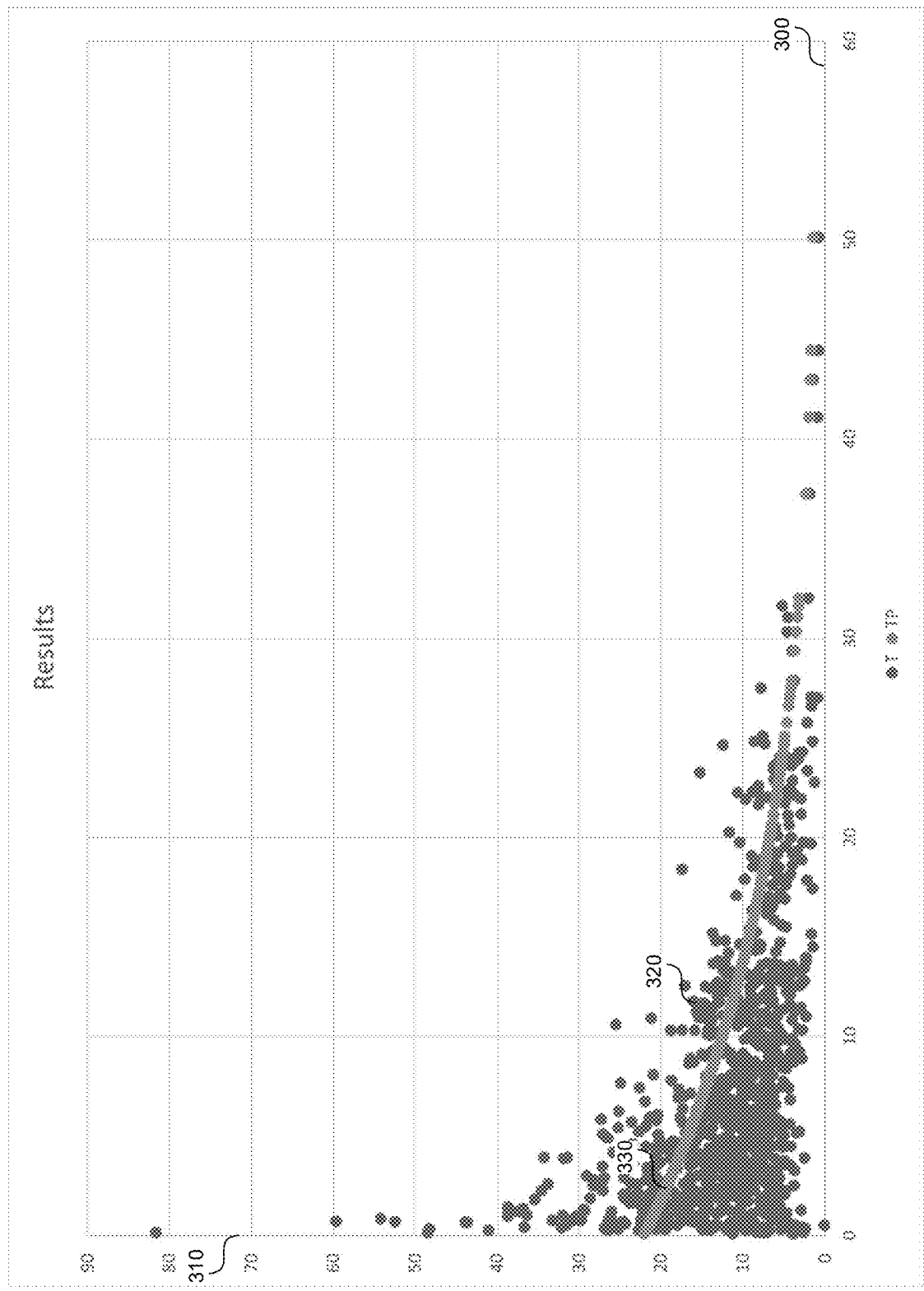
FIG. 3 shows a throughput prediction based on a single attribute.

FIG. 3 shows a throughput prediction based on a single attribute. Throughput, like latency, depends on multiple attributes of the network 100. One of the most important network attributes is the number of users associated with a network element for which the prediction is to be made. The X axis 300 shows the number of users, while the Y axis 310 shows throughput in Mbps. Area 320 in the graph is the observed data from the network 100. Curve 330 shows the prediction of a polynomial regression model based solely on one attribute, the number of users.

As can be seen in FIG. 3, the observed data 320 shows a high degree of fuzziness because the throughput can span 30 Mbps for most of the samples. Consequently, the curve 330, based on number of users only, poorly predicts the throughput of the network 100.

Figure 4:
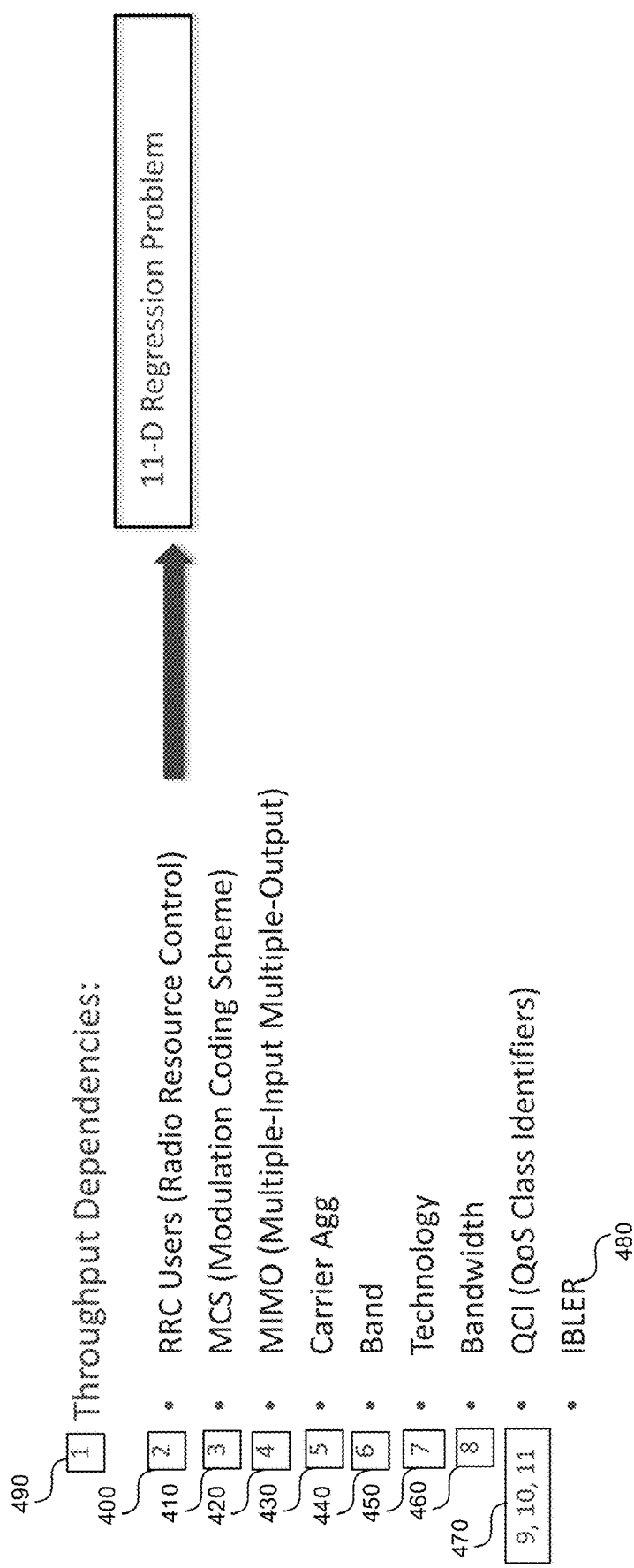
FIG. 4 shows various attributes input to the machine learning model.

FIG. 4 shows various attributes 220, 230 in FIG. 2B input to the machine learning model. The attributes 400, 410, 420, 430, 440, 450, 460, 470, 480 and the predicted attribute 490 create a regression problem. Attribute 400, radio resource control (RRC), represents the number of users. Attributes including modulation coding scheme 410, multiple input multiple output 420, carrier aggregation 430, QCI 470 and number of users 400 belong to KPIs 220 in FIG. 2B, while attributes band 440, bandwidth 460, and generation of technology 450 belong to configuration parameters 230 in FIG. 2B. The system can consider various other attributes. The attributes that the system considers are not dependent on each other. In other words, the attributes 400, 410, 420, 430, 440, 450, 460, 470, 480 that the system considers are not a function of each other.

Attribute 410, modulation coding scheme (MCS), indicates a UE score in terms of the network quality. MCS defines how many useful bits can be transmitted per resource element (RE). MCS depends on radio link quality. The better the quality, the higher the MCS and the greater the amount of useful data that can be transmitted. Conversely, the worse the radio conditions, the lower the MCS and the lesser the amount of useful data that can be transmitted. In other words, MCS depends on error probability. Typically, the error probability threshold is defined as equal to 10%. To maintain error probability at equal to or below this value, MCS is adjusted accordingly in varying radio conditions. In LTE the adjustment is done once per TTI (1 ms) individually for each active user. For example, if a UE is far away from the site, such as in a basement or in a garage where the UE has a high error rate, the MCS is adjusted to a worse coding scheme with a lower amount of useful bits, to fall below the error probability threshold.

Attribute 420, multiple-input and multiple-output (MIMO), is a method for multiplying the capacity of a radio link using multiple transmission and receiving antennas to exploit multipath propagation. MIMO has become an essential element of wireless communication standards including IEEE 802.11n (Wi-Fi 4), IEEE 802.11ac and .ax (Wi-Fi 5 and 6), HSPA+(3G), WiMAX, long-term evolution (LTE), and 5G. More recently, MIMO has been applied to power-line communication for three-wire installations as part of the ITU G.hn standard and the HomePlug AV2 specification. MIMO specifically refers to a practical technique for sending and receiving more than one data signal simultaneously over the same radio channel by exploiting multipath propagation. For example, if the UE is moving fast, or there are a lot of obstacles that cause the signal to fade, such as buildings between the UE and the base station, the number of paths between the base station and the UE can be reduced, and consequently the UE can receive a poor-quality signal. Attribute 420 is not available in crowdsourced data.

Attribute 430, carrier aggregation, is a technique used in wireless communication to increase the data rate per user, whereby multiple frequency blocks (called bands) are assigned to the same user. The maximum possible data rate per user increases as more bands are assigned to a user. The sum data rate of a cell increases, as well, because of better resource utilization. In addition, load balancing is possible with carrier aggregation. For example, LTE has different LTE bands, such as mid-band and low-band. The UE can get higher throughput from combining all bands. The UE can get 5 Mbps on the low-band and 10 Mbps on the mid-band, for a total of 15 Mbps that is divided between two different antennas or two different cells.

Attribute 440, band, indicates the throughput provided for each band. Performance of the band differs depending on the frequency. Mid-band performance differs from low-band performance. The low-band can travel more than the mid-band, but the speed of the low-band is lower than the speed of the mid-band. For example, if the UE is in a garage, then most probably the LTE that the UE is getting is the low band, e.g., 600 megahertz, because the low band has a larger wavelength and can penetrate through obstacles more than the mid-band.

Attribute 450, technology, indicates the generation of technology associated with the network 100, such as 2G, 3G, 4G, 5G, 6G, etc., as well as other wireless protocols, such as IEEE 802.11ac, 0.11ax, etc.

Attribute 460, bandwidth, indicates the amount of available spectrum. For example, cell A has only 10 megahertz of mid-band, and cell B has 20 megahertz of mid-band. If only cell A is available to a UE, the attribute 460 is 10 MHz. If only cell B is available to a UE, the attribute 460 is 20 MHz. However, if cell A and cell B are combined, the attribute 460 is 30 megahertz, because the two cells combined can provide higher throughput to the UE.

Attribute 470, QoS class identifier (QCI), is a mechanism used in 3GPP LTE networks to ensure carrier traffic is allocated the appropriate quality of service (QoS). Different carrier traffic requires different QoS and therefore different QCI values. QCI value 9 is typically used for the default carrier of a UE for non-privileged subscribers. For example, when a UE is engaged in a session with the network 100 in FIG. 1, the network classifies the UE by, for example, the type of connection. The connection can be tethering versus a hotspot. The network 100 can provide a quality of service, and throughput, to a UE based on the throughput needs of the UE. Each QCI has priority level, packet delay budget and packet error loss rate depending on the session type or carrier traffic. For example packet loss rate for a voice call is different than that of video streaming. Consequently, UE's throughput correlation with the other 10 parameters or attributes is different from one QCI to another. In this implementation, the machine learning model 210 in FIG. 2B receives the three main QCIs that are being used by the network.

Attribute 480, initial block error rate (IBLER), can also be included as an input to the machine learning model.

Figure 5:
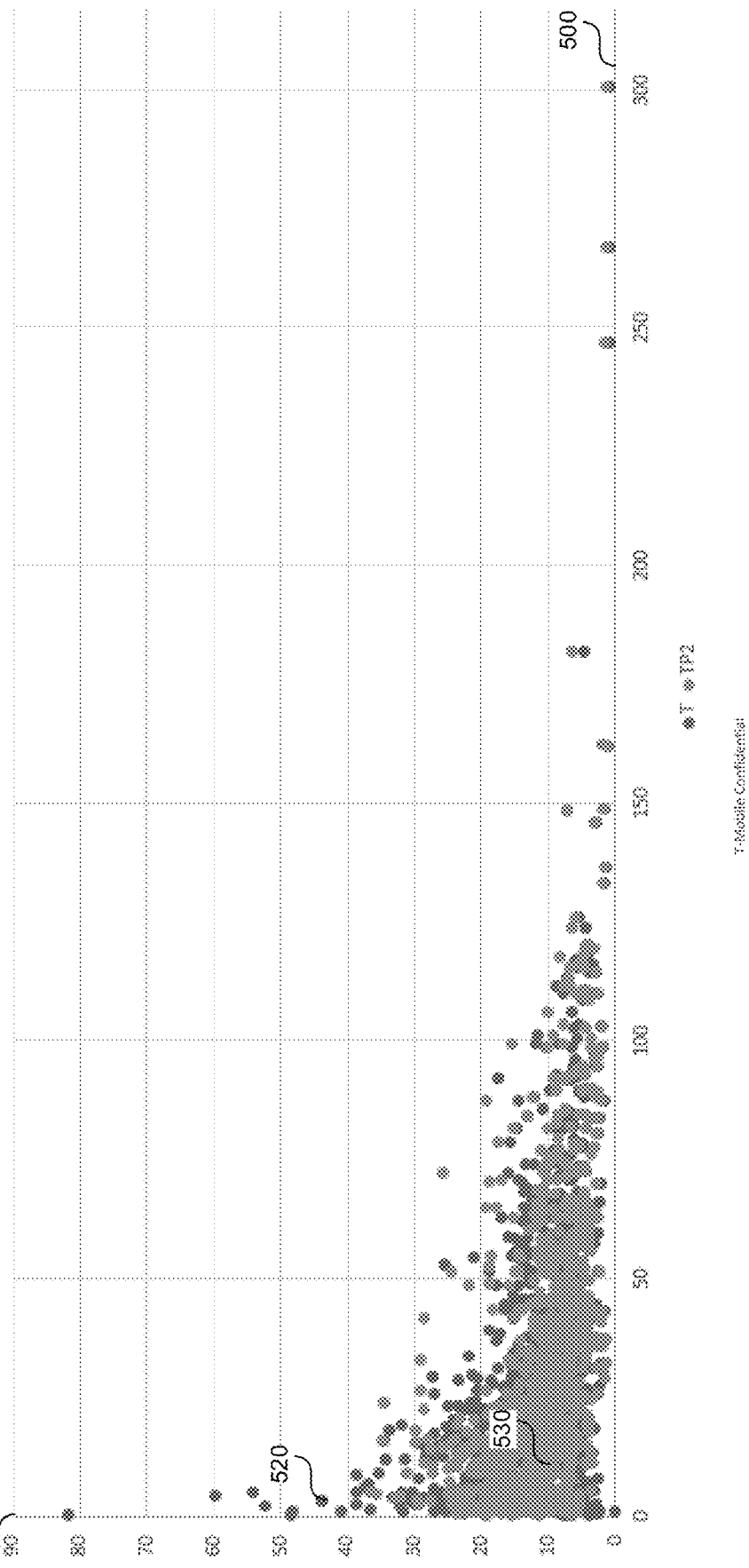
FIG. 5 shows the results obtained when an 11-dimensional prediction was made.

FIG. 5 shows the results obtained when an 11-dimensional prediction was made. The X axis 500 shows the number of users, while the Y axis 510 shows throughput in Mbps. Area 520 in the graph is the observed data from the network 100. Area 530 shows the prediction of the machine learning model based on 10 attributes 400-470 in FIG. 4.

Unlike in FIG. 3, in FIG. 5, the prediction 530 closely approximates the observed data 520. Both the prediction 530 and the observed data 520 show a high degree of fuzziness, namely, there are many throughputs for the same number of users. Consequently, increasing the problem from a two-dimensional to a regression problem drastically increases the accuracy of the prediction.

In addition, to increase the accuracy of the prediction, the machine learning model is trained using data obtained directly from the network 100 in FIG. 1, as opposed to using crowdsourced data. The accuracy of the disclosed system is Mean Absolute Error (MAE) of 0.25 and $R^2$ of 0.8. The lower the MAE, the better the accuracy of prediction. $R^2$ provides a measure of how well the model replicates observed outcomes, based on the proportion of total variation of outcomes explained by the model. The higher the $R^2$, the better the accuracy of prediction. By contrast, other prediction models that do not use data directly obtained from the network, and do not use the attributes 400-470, produce MAE of 0.561 and $R^2$ of 0.537, considerably worse than MAE of 0.25 and $R^2$ of 0.8 of the disclosed system.

Predicting an Attribute of an Immature Wireless Telecommunication Network

Figure 6:
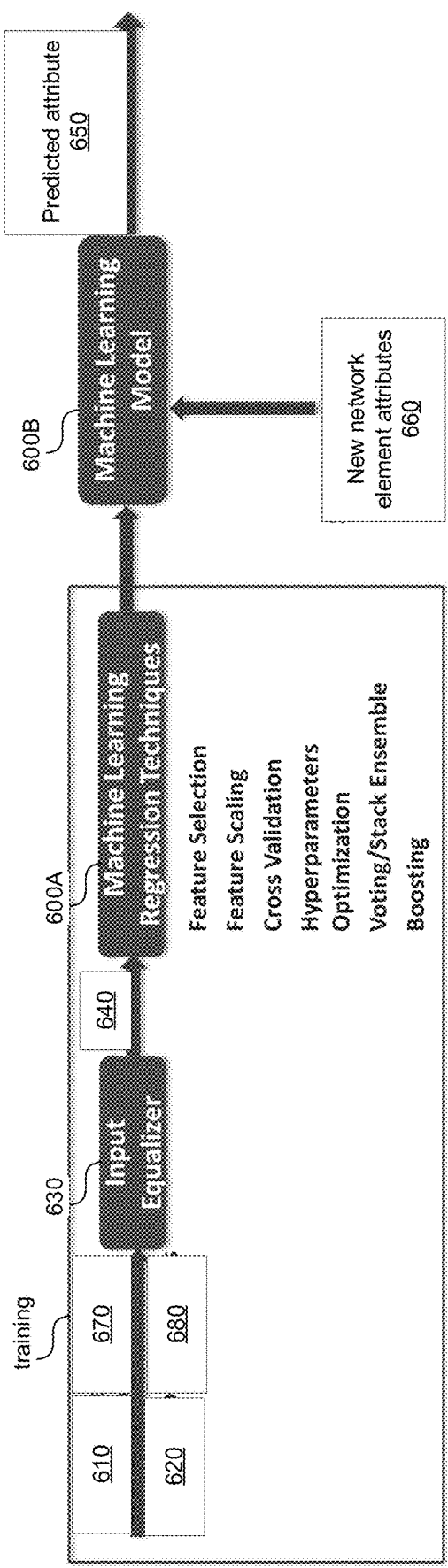
FIG. 6 shows a process of training a machine learning model to predict an attribute of an immature network, when the attribute has many dependencies.

FIG. 6 shows a process of training a machine learning model to predict an attribute of an immature network, when the attribute has many dependencies. The network 100 can be an immature, e.g., new, network such as a 6G or 5G network. The problem with the immature network 100 is that the network doesn't produce enough reliable data to make a prediction. For example, the immature network 100 can be functional and offer services to some users, but can still undergo a lot of configuration and usage changes. Generally, it takes around two years for an immature network 100 to mature, that is become established, and provide sufficient data for prediction.

For example, one issue with the immature network is that the number of UEs using the network can change as the network matures. Consequently, when the network 100 is mature, the data obtained from the devices does not provide sufficient and sufficiently diverse training data for the machine learning model.

Another issue with the immature network 100 is that the software running on the immature network can change in the future with feature additions, bug fixes, and software updates. A third issue with the immature network 100 is network deployment to various geographic areas. For example, the immature network 100 is initially deployed in a specific geographic area, before being deployed in other geographic areas. Geographic areas can have different network attributes and obtaining data from a network 100 in a particular geographic area may not be helpful in making predictions for a network in a different geographic area.

A fourth issue is that the layer management strategy is immature. Layer management strategy determines when and how a session between a UE and a network is handed over between different network layers, such as handing off a call between two different 5G network layers. For an immature network, a specific 5G layer footprint may not be available in a particular area, and so when a UE enters the particular area, the layer management abruptly switches to the other layer with worse performance or even a dropped call.

A fifth issue is spectrum refarming (SR). SR is a radio resource management technique which allows different generations of cellular networks to operate in the same radio spectrum. In an immature network, SR may not be complete, and only some of the spectrum can be refarmed from 4G use to 5G use.

As explained in FIG. 4, the machine learning model 600 can take in as inputs attributes of the mature network such as key performance indicators 610 and configuration parameters 620. In addition, the machine learning model 600 can take in as inputs attributes of the immature network such as a key performance indicators 670 and configuration parameters 680. The machine learning model 600 can include the machine learning model during training 600A, and the trained machine learning model 600B that has been deployed.

For the immature network, the key performance indicators 670 and the configuration parameters 680 go through an input equalizer 630 prior to being provided to the machine learning model 600 for training. The input equalizer 630 equalizes, e.g., filters, the incorrect input data 670 gathered from the immature network 100. The input equalizer 630 can also filter the incorrect input data 680 gathered from the immature network 100. The machine learning model 600A, in training, takes as input the filtered data 640.

The total number of attributes 610, 620, 670, 680 provided to the machine learning model 600 can be 10 or more, thus creating a multidimensional space. The system obtains attributes 610, 620, 670, 680 directly from the network for which the attribute 650 is predicted. In contrast, other prediction models obtain data from crowdsourced databases where data from multiple networks has been combined, and try to predict an attribute of a different network. The accuracy of such prediction models is much lower than the accuracy of the currently disclosed model, as described in this document.

The machine learning model 600 can be trained using various training techniques such as feature selection, feature scaling, cross validation, hyperparameter optimization, voting/stack ensemble, and/or boosting. Once trained, the machine learning model 600 can be used to predict the attribute 650 for a new network element. The machine learning model 600 takes as input the attributes 660 of the new network element associated with the immature network. The attributes 660 belong to the same categories as the attributes 610, 620, 670, 680, as described in this document, however, the values of attributes 660 are not part of the training attributes 610, 620, 670, 680.

Figure 7:
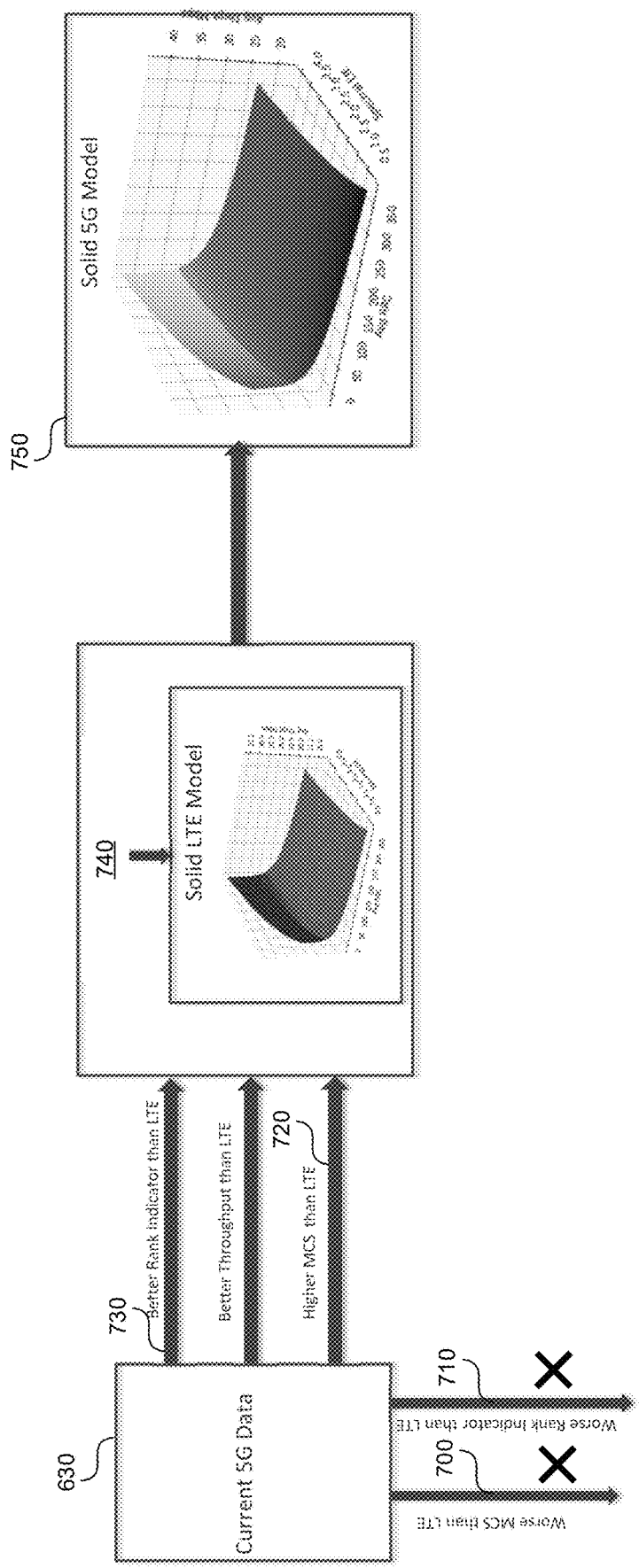
FIG. 7 shows the operation of the input equalizer.

FIG. 7 shows the operation of the input equalizer. The input equalizer 630 can obtain data from two telecommunication networks, an immature network and a mature network, where the immature and the mature network correspond to each other. For two networks to correspond to each other, a physical layer of the mature wireless telecommunication network corresponds to a physical layer of the immature wireless telecommunication network. For example, the two networks correspond to each other when they use the same method of encoding digital data, orthogonal frequency-division multiple access (OFDMA), on at least one of uplink or downlink. OFDMA is a multi-user version of the popular orthogonal frequency-division multiplexing (OFDM) digital modulation scheme. Multiple access is achieved in OFDMA by assigning subsets of subcarriers to individual users. This allows simultaneous low-data-rate transmission from several users. OFDM is a type of digital transmission and a method of encoding digital data on multiple carrier frequencies.

A further assumption is that the immature network performs at least as well as the mature network. The input equalizer 630 upon receiving data 610, 620, 670, 680 in FIG. 6 from both networks, compares the corresponding data between the two networks, and when data 670, 680 from the immature network indicates worse performance than the data 610, 620 from the mature network, the input equalizer substitutes the data indicating worse performance with the data from the mature network. When the data 610, 620 from the mature network indicates performance equal to or superior to the data from the 4G network, the input equalizer 630 provides the 5G data as provided to the machine learning model. The corresponding data can mean that the data from the two networks belongs to two antennas, one antenna associated with the immature network and one associated with the mature network, but the two antennas are under the same site, the same location, and the same band.

For example, the immature network can be a 5G network, while the mature network can be a 4G network. One antenna is associated with the 5G network, and the other with the 4G network. The two antennas are under the same site, the same location, and the same band, such as band 41, with a frequency of 2.5 gigahertz. The content for the two antennas is the same. The phone, the UEs around the site, and all the buildings are the same around each cell because the two antennas are co-located. The data for the 5G antenna can indicate worse performance of the data for the 4G antenna. In that case, the input equalizer 630 can replace the data from the 5G antenna with the data from the 4G antenna.

For example, the input equalizer 630 can receive two inputs 700, 710, which indicates worse performance of the immature network compared to the mature network. Input 700 can indicate that the 5G network has worse MCS than 4G, while input 710 can indicate worse MIMO than 4G. Consequently, the input equalizer 630 can substitute the data from the 4G network instead of the data from the 5G network, and provide the new data 720, 730 to the machine learning model 750.

For ease of representation, box 740 shows a three-dimensional visualization of the prediction produced by the machine learning model. In reality, the machine learning model works in an 11-dimensional space.

Figure 8:
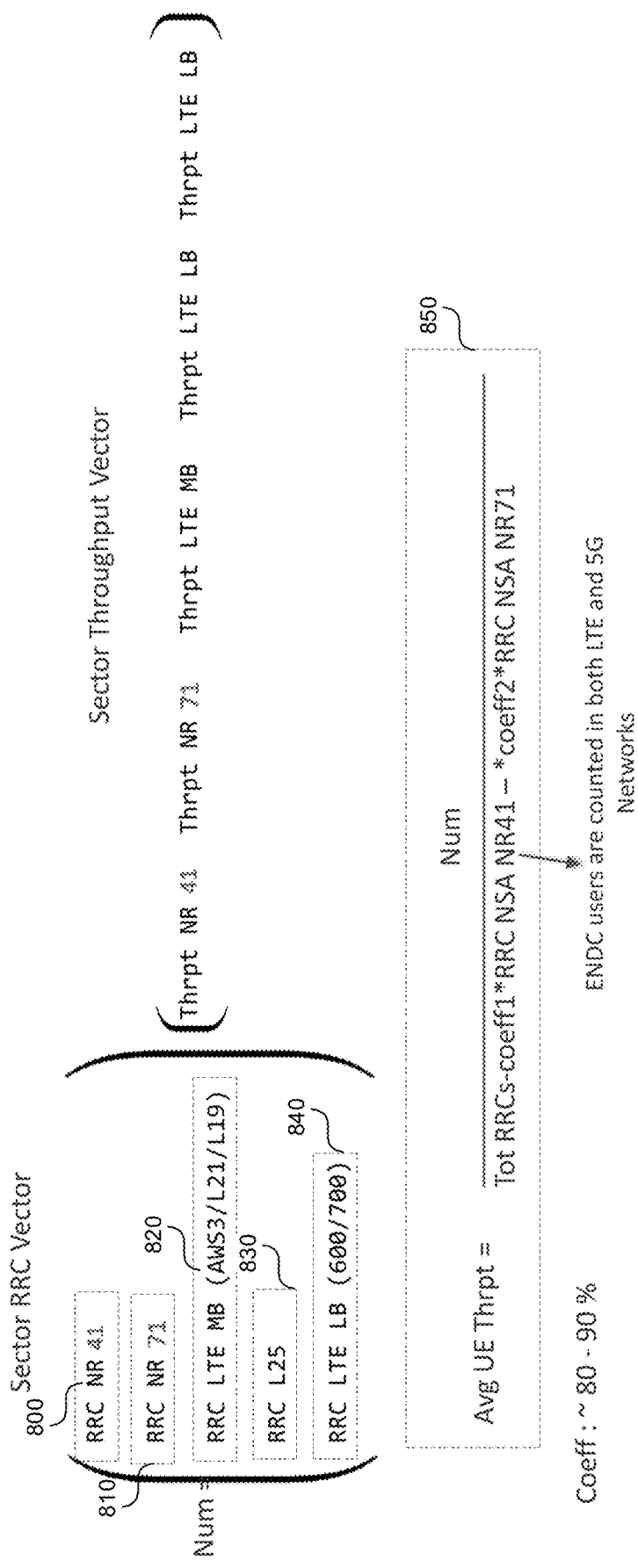
FIG. 8 shows how to calculate the average throughput on both technologies 4G, 5G, taking into account E-UTRAN New Radio-Dual Connectivity (ENDC) UEs.

FIG. 8 shows how to calculate the average throughput on both technologies 4G, 5G, taking into account ENDC UEs. ENDC UEs are getting throughput from both technologies, 5G and 4G, at the same time. ENDC is the scientific term for Non Standalone or NSA between 5G and 4G. ENDC allows user equipment to connect to an LTE enodeB that acts as a master node and a 5G gnodeB that acts as a secondary node. Formula 850 calculates the average throughput without separating the UE experience between the two technologies and without counting the users twice in both technologies.

For example, out of 100 5G UEs, if just 20% are standalone, i.e., they only communicate with the 5G network, and the rest of UEs, i.e., 80%, communicate with both. The 80% of the UEs that use both 5G and 4G are counted in both sets of data 610, 620, 670, 680. For example, the number of UEs counted in elements 800, 810 are double counted, as explained above, while the number of UEs counted in elements 820, 830, 840 are single counted. Consequently, to correct the average throughput used in training of the machine learning model, the average throughput is calculated according to the formula 850.

Flowcharts

Figure 9:
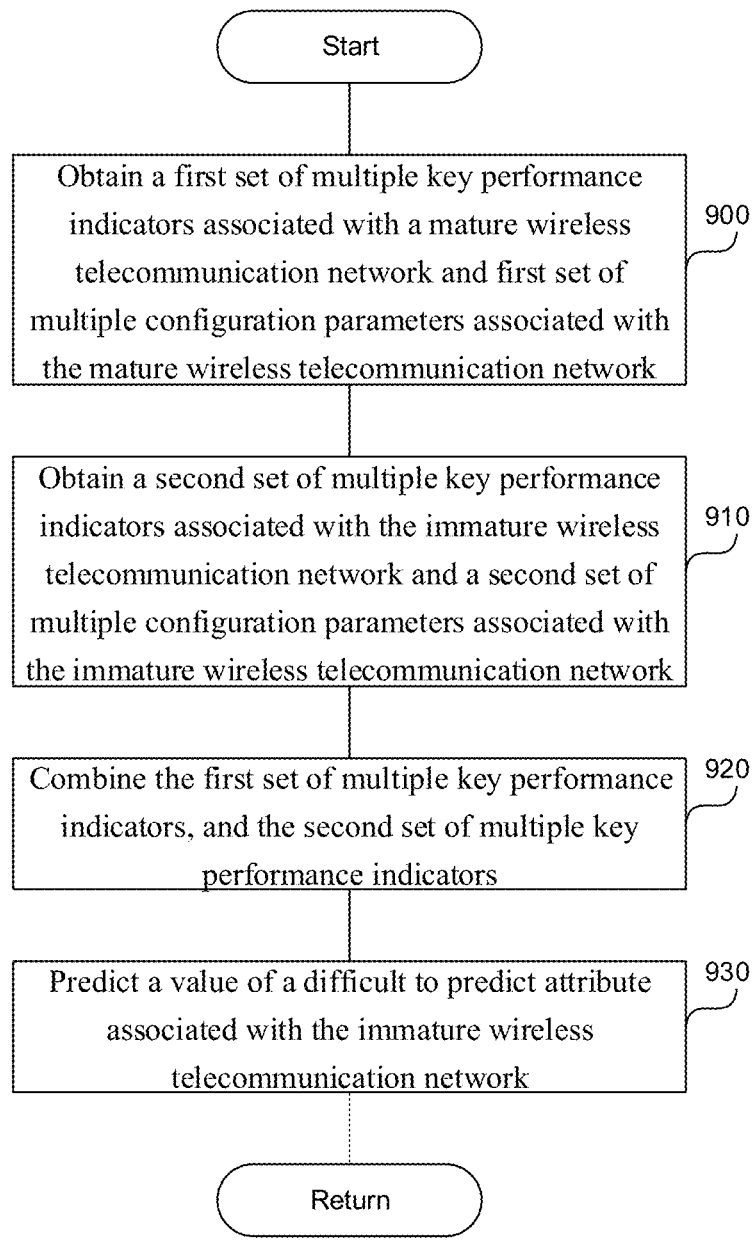
FIG. 9 is a flowchart of a method to predict a value of an attribute associated with an immature network.

FIG. 9 is a flowchart of a method to predict a value of an attribute associated with an immature network. The wireless telecommunication network can be 5G, 6G, etc.

In step 900, a hardware or software processor executing instructions described in this document can obtain a first set of multiple key performance indicators associated with a mature wireless telecommunication network and a first set of multiple configuration parameters associated with the mature wireless telecommunication network. The first set of multiple key performance indicators indicates an observed performance associated with the mature wireless telecommunication network. The multiple configuration parameters indicate a configuration of the mature wireless telecommunication network. The first set of multiple key performance indicators and the first set of multiple configuration parameters include quality of service class identifiers, modulation coding scheme, multiple-input multiple-output, carrier aggregation, a number of users, band, bandwidth, and a generation of wireless technology associated with the mature wireless telecommunication network.

The mature wireless telecommunication network can immediately precede the immature wireless telecommunication network in the generation of wireless technology. For example, the mature network can be a 4G network, while the immature network can be a 5G network. A physical layer of the mature wireless telecommunication network corresponds to a physical layer of the immature wireless telecommunication network. For example, the physical layer can indicate the digital modulation scheme such as OFDMA on at least one of the uplink and/or the downlink. The processor can determine the mature wireless telecommunication network corresponding to the immature wireless telecommunication network by determining that a digital modulation scheme associated with the physical layer of the mature wireless telecommunication network corresponds to the digital modulation scheme associated with the physical layer of the immature wireless telecommunication network. Further, the processor can determine that the digital modulation scheme associated with the physical layer of the mature wireless telecommunication network and the digital modulation scheme associated with the physical layer of the mature wireless telecommunication network include OFDMA.

In step 910, the processor can obtain a second set of multiple key performance indicators associated with the immature wireless telecommunication network and a second set of multiple configuration parameters associated with the immature wireless telecommunication network.

In step 920, the processor can combine the first set of multiple key performance indicators ("mature KPIs") and the second set of multiple key performance indicators ("immature KPIs") to obtain multiple key performance indicators. To combine the mature and immature KPIs, the processor can compare a first key performance indicator in the first set of multiple key performance indicators to a corresponding second key performance indicator in the second set of multiple key performance indicators. Based on the comparison, the processor can determine whether the second key performance indicator indicates worse performance than the first key performance indicator. Upon determining that the second key performance indicator indicates worse performance than the first key performance indicator, the processor can replace the second key performance indicator with the first key performance indicator.

In step 930, the processor can predict a value of an attribute associated with the wireless telecommunication network. The attribute can be a difficult to predict attribute because the attribute depends on multiple other attributes associated with the wireless telecommunication network. The attribute can be throughput or latency. The processor can identify the difficult to predict attribute by identifying an attribute the depends on multiple other attributes associated with the wireless telecommunication network.

To predict the attribute, the processor can provide the multiple key performance indicators and the second set of multiple configuration parameters to a machine learning model trained on data associated with the mature wireless telecommunication network. The machine learning model can predict the value of the attribute associated with the immature wireless telecommunication network based on the multiple key performance indicators and the second set of multiple configuration parameters.

The processor can train the machine learning model. The processor can obtain a third set of multiple key performance indicators and a third set of multiple configuration parameters. The third set of multiple key performance indicators and the third set of multiple configuration parameters can be associated with the mature network and/or with the immature network. The processor can train the machine learning model using the third set of multiple key performance indicators and the third set of multiple configuration parameters.

Figure 10:
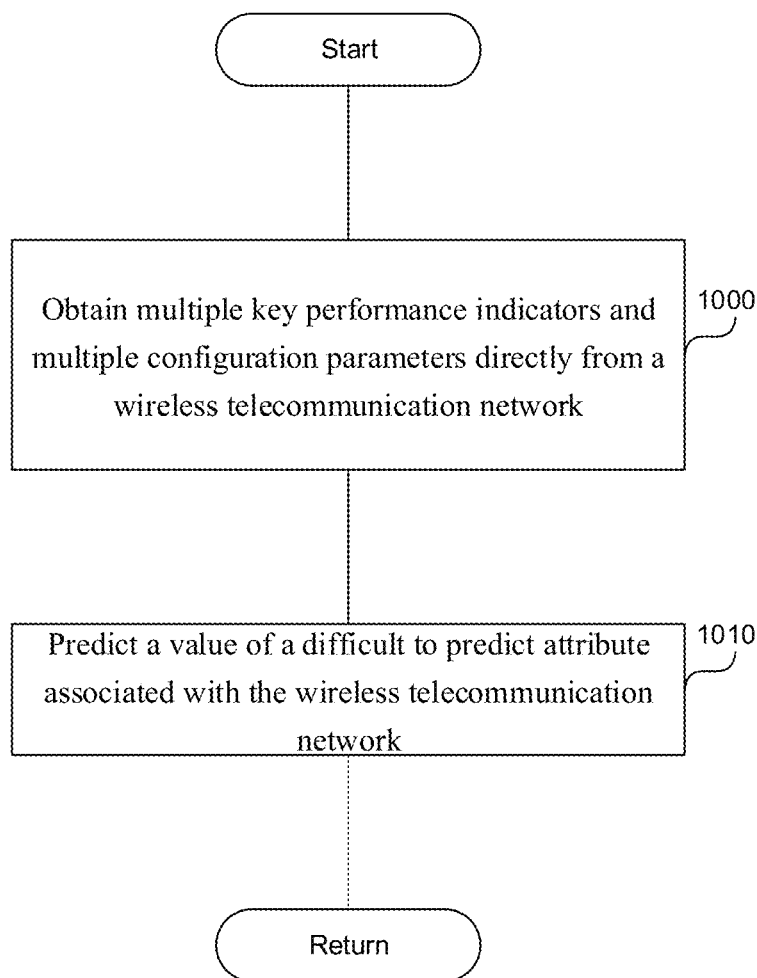
FIG. 10 is a flowchart of a method to predict a value of a difficult to predict attribute associated with a wireless telecommunication network.

FIG. 10 is a flowchart of a method to predict a value of a difficult to predict attribute associated with a wireless telecommunication network. In step 1000, a processor can obtain multiple key performance indicators and multiple configuration parameters directly from a wireless telecommunication network. The multiple key performance indicators indicate an observed performance associated with the wireless telecommunication network. The multiple configuration parameters indicate a configuration of the wireless telecommunication network. The multiple key performance indicators include a number of users associated with the wireless telecommunication network. The multiple configuration parameters include a generation of wireless technology associated with the wireless telecommunication network. The first set of multiple key performance indicators includes quality of service class identifiers, modulation coding scheme, multiple-input multiple-output, carrier aggregation, and a number of users. The first set of multiple configuration parameters includes band, bandwidth, and generation of wireless technology associated with the mature wireless telecommunication network.

When the processor obtains multiple key performance indicators and multiple configuration parameters directly from the wireless telecommunication network, the resulting prediction produces a difference between the predicted value of the attribute and an observed value of the attribute having Mean Absolute Error less than 0.5, and $R^2$ greater than 0.5. By contrast, when using crowdsourced data, the prediction has Mean Absolute Error greater than 0.5, and $R^2$ less than 0.5.

To obtain multiple key performance indicators and multiple configuration parameters, the processor can obtain at least six of: a quality of service class identifier, number of users, modulation coding scheme, multiple-input multiple-output, carrier aggregation, band, bandwidth, and generation of wireless technology associated with the wireless telecommunication network.

In step 1010, the processor can predict a value of a difficult to predict attribute of the wireless telecommunication network. The attribute is difficult to predict because the attribute depends on multiple other attributes associated with the wireless telecommunication network. The attribute can be throughput or latency of the wireless telecommunication network. The processor can identify the difficult to predict attribute by identifying an attribute the depends on multiple other attributes associated with the wireless telecommunication network.

To make the prediction, the processor can provide the multiple key performance indicators and the multiple configuration parameters to a machine learning model. The machine learning model can predict the value of the difficult to predict attribute associated with the wireless telecommunication network based on the multiple key performance indicators and the multiple configuration parameters. Machine learning model is trained on multiple key performance indicators and multiple configuration parameters that the difficult to predict attribute is dependent on. Each attribute among multiple key performance indicators and the multiple configuration parameters does not depend on other attributes used in training.

The processor can train the machine learning model by obtaining at least six attributes including a quality of service class identifier, number of users, modulation coding scheme, multiple-input multiple-output, carrier aggregation, band, bandwidth, and generation of wireless technology associated with the wireless telecommunication network. The processor can train the machine learning model using the at least six attributes.

Figure 11:
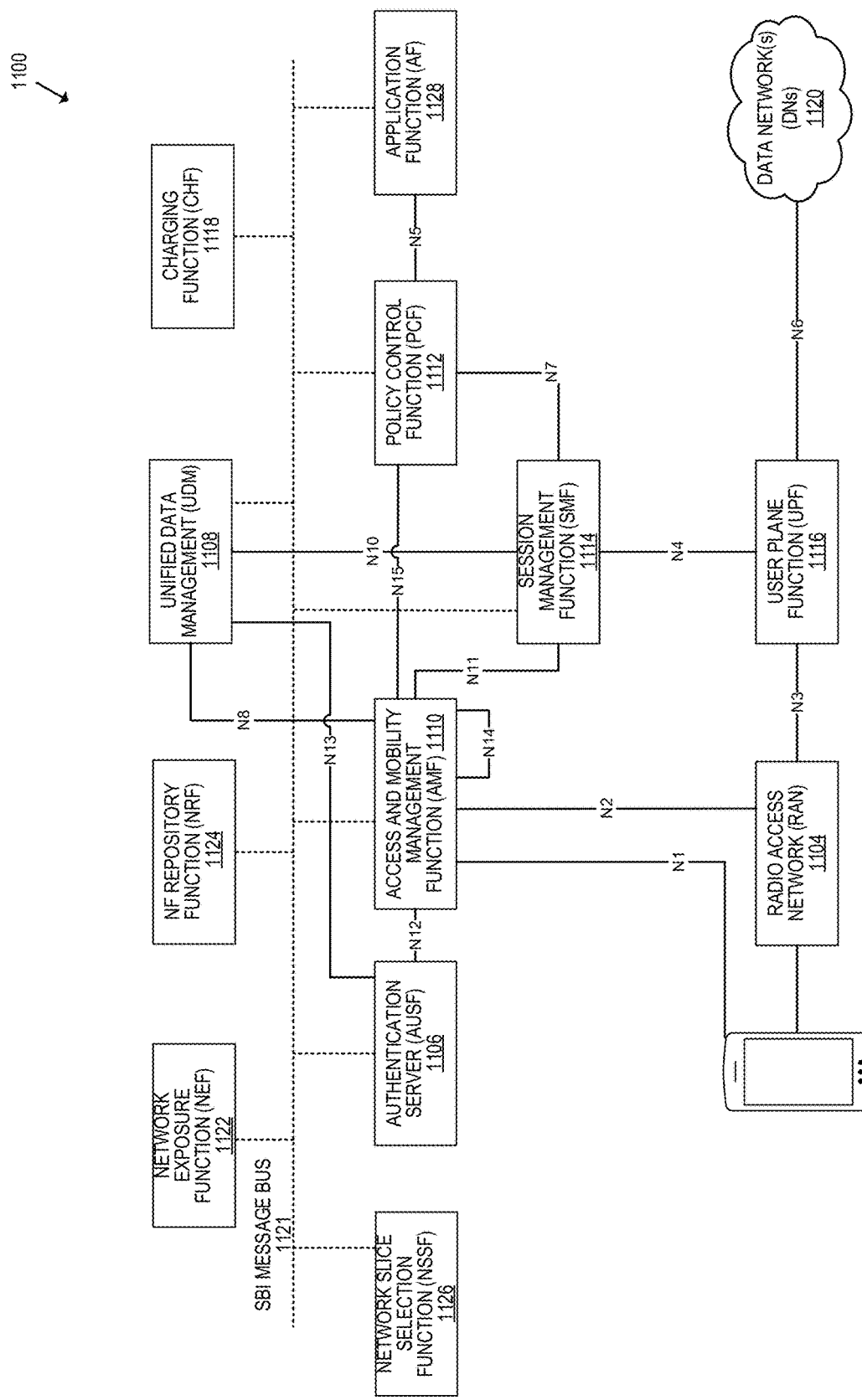
FIG. 11 is a block diagram that illustrates an example of a computer system in which at least some operations described herein can be implemented.

FIG. 11 is a block diagram that illustrates an architecture 1100 including network functions (NFs) of a 5G network that can implement aspects of the present technology. A wireless device 1102 can access the 5G network through a NAN (e.g., gNB) of a RAN 1104. The NFs include an Authentication Server Function (AUSF) 1106, a Unified Data Management (UDM) 1108, an Access and Mobility management Function (AMF) 1110, a Policy Control Function (PCF) 1112, a Session Management Function (SMF) 1114, a User Plane Function (UPF) 1116, and a Charging Function (CHF) 1118.

The interfaces N1 through N15 define communications and/or protocols between each NF as described in relevant standards. The UPF 1116 is part of the user plane and the AMF 1110, SMF 1114, PCF 1112, AUSF 1106, and UDM 1108 are part of the control plane. One or more UPFs can connect with one or more data networks (DNs) 1120. The UPF 1116 can be deployed separately from control plane functions. The NFs of the control plane are modularized such that they can be scaled independently. As shown, each NF service exposes its functionality in a Service Based Architecture (SBA) through a Service Based Interface (SBI) 1121 that uses HTTP/2. The SBA can include a Network Exposure Function (NEF) 1122, a NF Repository Function (NRF) 1124 a Network Slice Selection Function (NSSF) 1126, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 1124, which maintains a record of available NF instances and supported services. The NRF 1124 allows other NF instances to subscribe and be notified of registrations from NF instances of a given type. The NRF 1124 supports service discovery by receipt of discovery requests from NF instances and, in response, details which NF instances support specific services.

The NSSF 1126 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 1102 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 1108 and then requests an appropriate network slice of the NSSF 1126.

The UDM 1108 introduces a User Data Convergence (UDC) that separates a User Data Repository (UDR) for storing and managing subscriber information. As such, the UDM 1108 can employ the UDC under 3GPP TS 22.101 to support a layered architecture that separates user data from application logic. The UDM 1108 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 1108 can contain voluminous amounts of data that is accessed for authentication. Thus, the UDM 1108 is analogous to a Home Subscriber Server (HSS), to provide authentication credentials while being employed by the AMF 1110 and SMF 1114 to retrieve subscriber data and context.

The PCF 1112 can connect with one or more application functions (AFs) 1128. The PCF 1112 supports a unified policy framework within the 5G infrastructure for governing network behavior. The PCF 1112 accesses the subscription information required to make policy decisions from the UDM 1108, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 1124. This allows the SCP to become the delegated discovery point in a datacenter, offloading the NRF 1124 from distributed service meshes that make-up a network operator's infrastructure. Together with the NRF 1124, the SCP forms the hierarchical 5G service mesh.

The AMF 1110 receives requests and handles connection and mobility management while forwarding session management requirements over the N11 interface to the SMF 1114. The AMF 1110 determines that the SMF 1114 is best suited to handle the connection request by querying the NRF 1124. That interface and the N11 interface between the AMF 1110 and the SMF 1114 assigned by the NRF 1124, use the SBI 1121. During session establishment or modification, the SMF 1114 also interacts with the PCF 1112 over the N7 interface and the subscriber profile information stored within the UDM 1108. Employing the SBI 1121, the PCF 1112 provides the foundation of the policy framework which, along with the more typical QoS and charging rules, includes Network Slice selection, which is regulated by the NSSF 1126.

Computer System

Figure 12:
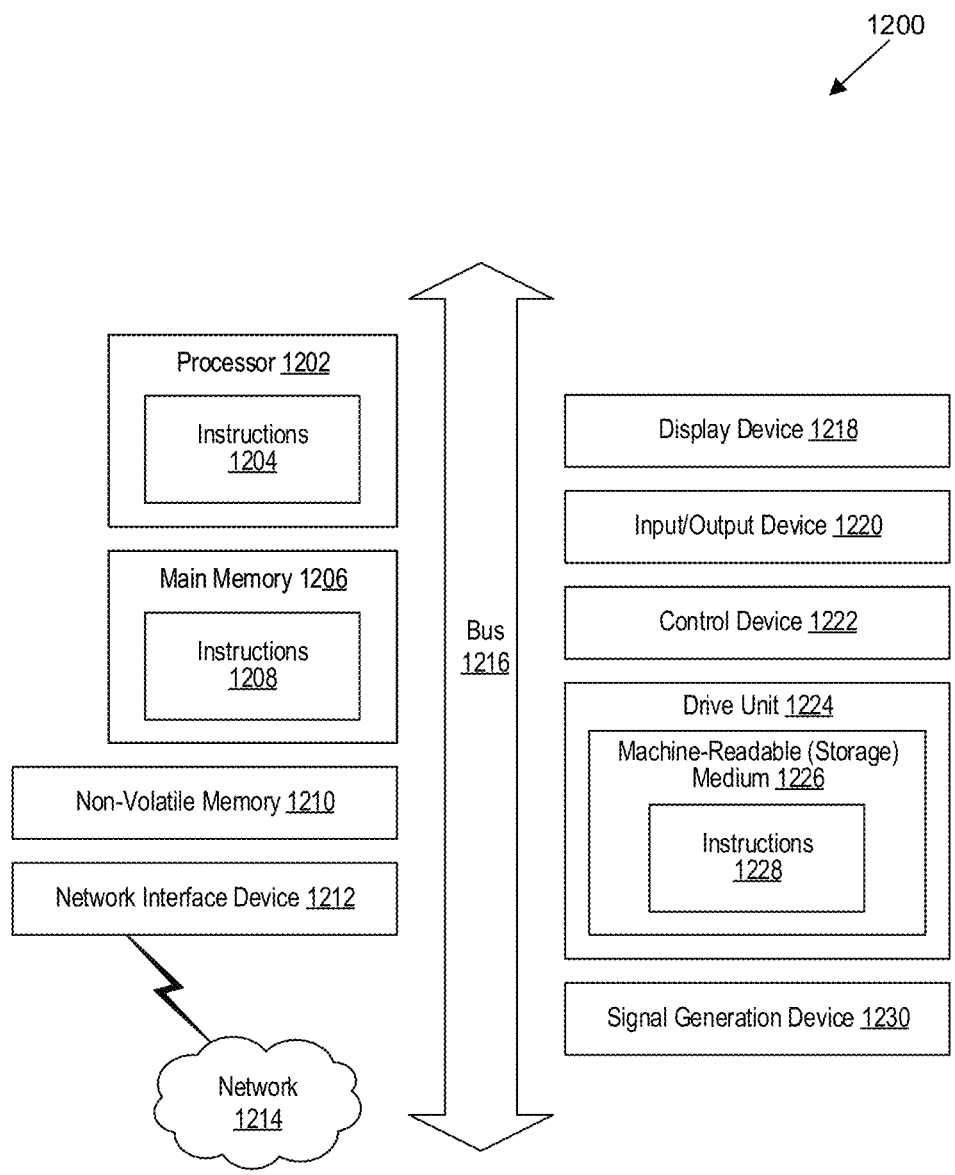
FIG. 12 is a block diagram that illustrates an example of a computer system in which at least some operations described herein can be implemented.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, video display device 1218, an input/output device 1220, a control device 1222 (e.g., keyboard and pointing device), a drive unit 1224 that includes a storage medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in this specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementation, the computer system 1200 can be an embedded computer system, a system-on-chip (SOC), a single-board computer system (SBC) or a distributed system such as a mesh of computer systems or include one or more cloud components in one or more networks. Where appropriate, one or more computer systems 1200 can perform operations in real-time, near real-time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/or associated caches and servers) that store one or more sets of instructions 1228. The machine-readable (storage) medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1210, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

Remarks

The terms "example," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this document as a whole and not to any particular portions of this document. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this or in a continuing application.

I claim:

1. At least one computer-readable storage medium, excluding transitory signals and carrying instructions to predict a throughput of an immature wireless telecommunication network, which, when executed by at least one data processor of a system, causes the system to:

obtain a first set of multiple key performance indicators associated with a mature wireless telecommunication network and a first set of multiple configuration parameters associated with the mature wireless telecommunication network,
wherein the first set of multiple key performance indicators indicates an observed performance associated with the mature wireless telecommunication network,
wherein the first set of multiple configuration parameters indicates a configuration of the mature wireless telecommunication network;

obtain a second set of multiple key performance indicators associated with the immature wireless telecommunication network and a second set of multiple configuration parameters associated with the immature wireless telecommunication network, wherein a physical layer of the mature wireless telecommunication network corresponds to a physical layer of the immature wireless telecommunication network;
combine the first set of multiple key performance indicators and the second set of multiple key performance indicators to obtain multiple key performance indicators; and
predict the throughput of the immature wireless telecommunication network by:
providing the multiple key performance indicators and the second set of multiple configuration parameters to a machine learning model trained on data associated with the mature wireless telecommunication network; and
predicting, by the machine learning model, the throughput of the immature wireless telecommunication network based on the multiple key performance indicators and the second set of multiple configuration parameters.

2. The computer-readable storage medium of claim 1, wherein the instructions to combine comprise instructions to:
compare a first key performance indicator in the first set of multiple key performance indicators to a corresponding second key performance indicator in the second set of multiple key performance indicators;
based on the comparison, determine whether the second key performance indicator indicates worse performance than the first key performance indicator; and
upon determining that the second key performance indicator indicates worse performance than the first key performance indicator, replace the second key performance indicator with the first key performance indicator.

3. The computer-readable storage medium of claim 1, the instructions comprising:
obtain a third set of multiple key performance indicators and a third set of multiple configuration parameters;
train the machine learning model using the third set of multiple key performance indicators and the third set of multiple configuration parameters.

4. The computer-readable storage medium of claim 1, wherein the first set of multiple key performance indicators comprises a quality of service class identifier, a modulation coding scheme, a multiple-input multiple-output, a carrier aggregation, and a number of users.

5. The computer-readable storage medium of claim 1, wherein the first set of multiple configuration parameters comprises a band, a bandwidth, and a generation of wireless technology associated with the mature wireless telecommunication network.

6. The computer-readable storage medium of claim 1, comprising instructions to:
determine the mature wireless telecommunication network corresponding to the immature wireless telecommunication network by determining that a digital modulation scheme associated with the physical layer of the mature wireless telecommunication network corresponds to the digital modulation scheme associated with the physical layer of the immature wireless telecommunication network.

7. The computer-readable storage medium of claim 1, comprising instructions to:
determine the mature wireless telecommunication network corresponding to the immature wireless telecommunication network by:
determining that a digital modulation scheme associated with the physical layer of the mature wireless telecommunication network corresponds to the digital modulation scheme associated with the physical layer of the immature wireless telecommunication network; and
determining that the digital modulation scheme associated with the physical layer of the mature wireless telecommunication network and the digital modulation scheme associated with the physical layer of the mature wireless telecommunication network include orthogonal frequency-division multiple access.

8. The computer-readable storage medium of claim 1, wherein the mature wireless telecommunication network immediately precedes the immature wireless telecommunication network in a generation of wireless technology.

9. A method comprising:
obtaining a first set of multiple key performance indicators associated with a mature wireless telecommunication network and a first set of multiple configuration parameters associated with the mature wireless telecommunication network,
wherein the first set of multiple key performance indicators indicates an observed performance associated with the mature wireless telecommunication network,
wherein the first set of multiple configuration parameters indicates a configuration of the mature wireless telecommunication network;
obtaining a second set of multiple key performance indicators associated with an immature wireless telecommunication network and a second set of multiple configuration parameters associated with the immature wireless telecommunication network,
wherein a physical layer of the mature wireless telecommunication network corresponds to a physical layer of the immature wireless telecommunication network;
combining the first set of multiple key performance indicators and the second set of multiple key performance indicators to obtain multiple key performance indicators; and
predicting a value of an attribute associated with the immature wireless telecommunication network,
wherein the attribute depends on multiple other attributes associated with the immature wireless telecommunication network,
wherein predicting includes:
providing the multiple key performance indicators and the second set of multiple configuration parameters to a machine learning model trained on data associated with the mature wireless telecommunication network; and
predicting, by the machine learning model, the value of the attribute associated with the immature wireless telecommunication network based on the multiple key performance indicators and the second set of multiple configuration parameters.

10. The method of claim 9, wherein combining comprises:
comparing a first key performance indicator in the first set of multiple key performance indicators to a corresponding second key performance indicator in the second set of multiple key performance indicators;
based on the comparison, determining whether the second key performance indicator indicates worse performance than the first key performance indicator; and upon determining that the second key performance indicator indicates worse performance than the first key performance indicator, replacing the second key performance indicator with the first key performance indicator.

11. The method of claim 9, comprising:
obtaining a third set of multiple key performance indicators and a third set of multiple configuration parameters;
training the machine learning model using the third set of multiple key performance indicators and the third set of multiple configuration parameters.

12. The method of claim 9, wherein the first set of multiple key performance indicators and the first set of multiple configuration parameters comprise quality of service class identifiers, modulation coding scheme, multiple-input multiple-output, carrier aggregation, number of users, band, bandwidth, and a generation of wireless technology associated with the mature wireless telecommunication network.

13. The method of claim 9, comprising:
determining the mature wireless telecommunication network corresponding to the immature wireless telecommunication network by determining that a digital modulation scheme associated with the physical layer of the mature wireless telecommunication network corresponds to the digital modulation scheme associated with the physical layer of the immature wireless telecommunication network.

14. The method of claim 9, comprising:
determining the mature wireless telecommunication network corresponding to the immature wireless telecommunication network by:
  determining that a digital modulation scheme associated with the physical layer of the mature wireless telecommunication network corresponds to the digital modulation scheme associated with the physical layer of the immature wireless telecommunication network; and
  determining that the digital modulation scheme associated with the physical layer of the mature wireless telecommunication network and the digital modulation scheme associated with the physical layer of the mature wireless telecommunication network include orthogonal frequency-division multiple access.

15. The method of claim 9, wherein the mature wireless telecommunication network immediately precedes the immature wireless telecommunication network in a generation of wireless technology.

16. A system comprising:
at least one hardware processor; and
at least one non-transitory memory storing instructions, which, when executed by the at least one hardware processor, cause the system to:
  combine a first set of multiple attributes associated with an established wireless telecommunication network and a second set of multiple attributes associated with a new wireless telecommunication network to obtain multiple attributes,
    wherein the first set of multiple attributes indicates an observed performance associated with the established wireless telecommunication network,
    wherein the second set of multiple attributes indicates an observed performance associated with the new wireless telecommunication network,
    wherein a physical layer of the established wireless telecommunication network corresponds to a physical layer of the new wireless telecommunication network, and
    wherein the new wireless telecommunication network is newer relative to the established wireless telecommunication network; and
  predict a value of an attribute associated with the new wireless telecommunication network, wherein the attribute depends on multiple other attributes associated with the new wireless telecommunication network, wherein the instructions to predict include the instructions to:
    a) provide the multiple attributes to a machine learning model trained on data associated with the established wireless telecommunication network; and
    b) predict, by the machine learning model, the value of the attribute associated with the new wireless telecommunication network based on the multiple attributes.

17. The system of claim 16, wherein the instructions to combine comprise instructions to:
compare a first attribute in the first set of multiple attributes to a corresponding second attribute in the second set of multiple attributes;
based on the comparison, determine whether the second attribute indicates worse performance than the first attribute; and
upon determining that the second attribute indicates worse performance than the first attribute, replace the second attribute with the first attribute.

18. The system of claim 16, wherein the first set of multiple attributes comprises quality of service class identifiers, modulation coding scheme, multiple-input multiple-output, carrier aggregation, number of users, band, bandwidth, and generation of wireless technology associated with the established wireless telecommunication network.

19. The system of claim 16, comprising instructions to:
determine the established wireless telecommunication network corresponding to the new wireless telecommunication network by:
  determining that a digital modulation scheme associated with the physical layer of the established wireless telecommunication network corresponds to the digital modulation scheme associated with the physical layer of the new wireless telecommunication network; and
  determining that the digital modulation scheme associated with the physical layer of the established wireless telecommunication network and the digital modulation scheme associated with the physical layer of the established wireless telecommunication network include orthogonal frequency-division multiple access.

20. The system of claim 16, wherein the established wireless telecommunication network immediately precedes the new wireless telecommunication network in a generation of wireless technology.

* * * * *